Patented May 16, 1933

1,909,354

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

METHOD OF CATALYTICALLY OXIDIZING AROMATIC COMPOUNDS

No Drawing.  Application filed February 8, 1929. Serial No. 338,614.

This invention relates to improvements in vapor phase catalyses in which organic compounds are oxidized to intermediate products or organic constituents of a mixture are removed by total oxidation.

The catalytic oxidation of organic compounds in the vapor phase presents a very serious problem in reaction control. The reactions are highly exothermic and unless very accurately controlled they tend to go all the way to total combustion. In the past organic oxidations have been controlled by accurate adjustment of temperature, period of contact with the catalyst and the like, and especially by the choice of suitable catalysts. Perhaps the most successful control is effected by using the so-called stabilized catalysts which contain compounds of the alkali metals, alkaline earth metals, or strongly basic earth metals, which have been described and claimed in my Patent No. 1,709,853 dated April 23, 1929. In the case of many reactions the use of stabilized catalysts permits good yields but even with the most carefully stabilized catalysts it is difficult to obtain high or almost quantitative yields in some reactions which are extremely delicate.

The present invention employs a different method of control from that used hitherto, namely association with the compound to be oxidized of vapors of other organic compounds which are readily oxidizable and which apparently react with the most active oxygen combined in the catalyst, so moderating its activity that the compound which it is desired to oxidize or purify is not destroyed or the destruction is very greatly decreased. It seems probable that the effect of the protective vapors is mainly due to the reaction of the protective agent with the most active oxygen as described above. However, it is not readily possible to determine what is going on in a vapor phase catalytic reaction and the invention is in no sense limited to the particular theory of action set out above.

Almost any organic compound which is more readily oxidized than the product which is to be oxidized to an intermediate compound or purified may be used as a protecting agent. Among the large number of compounds which may be so used are aliphatic alcohols, such as methyl alcohol; carbon monoxide; paraffin hydrocarbons such as gasoline, petroleum ether, etc.; unsaturated aliphatic compounds; many relatively easily oxidizable compounds; alicyclic compounds; and the like. Hydrogen may also be used. In fact the present invention is in no sense limited to the use of any particular protecting agent. Some of the protecting agents, for example paraffin hydrocarbons tend to be burned to carbon dioxide and water. Others, such as paraffin alcohols like methyl alcohol may be transformed into aldehydes and it is a peculiar advantage of this modification of the invention that the protective agent is not wasted but is transformed into a useful compound and curious as it may seem the yields of the intermediate compound to which the protective agent is oxidized are often increased over those possible when the protective agent is oxidized alone. Thus, for example, when methyl alcohol is used as a protective agent in certain reactions better transformations to formaldehyde are obtained. This makes the process a very attractive one for then not only is the main catalytic reaction improved but the protective agent itself is transformed into a more valuable compound in a very effective manner.

While it is an advantage of the present invention that it may be used in any catalysis, it is preferable to choose the best conditions for high yields, thus combining the control feature of the present invention with those hitherto used. So, for instance, the best stabilized catalysts and preferably catalysts containing base exchange bodies or their derivatives, as described and claimed in my prior patents No. 1,694,122 dated December 4, 1928, No. 1,735,763 dated November 12, 1929 and No. 1,722,297 dated July 30, 1929 and my co-pending applications, Serial No. 294,597 filed July 21, 1928 and Serial No. 336,335 filed January 30, 1929, should be used together with the best methods of temperature control and other reaction conditions such as oxygen concentration, and the like. Even though the process of the present invention produces very much better results than otherwise obtainable even when used with relatively unsatisfactory catalysts or other reaction conditions, it is of course always desirable to obtain the best results although the invention is in no sense limited to processes in which all the conditions for best results are present.

It is also frequently desirable to carry out the reactions of the present invention in a circulatory process. This is especially desirable where a protective agent such as methyl alcohol is used and where a useful product is obtained by the oxidation of the protective agent. The reaction products are of course separated out before recirculation and the carrier gas may be any suitable mixture such as carbon dioxide and oxygen, and the like. Fresh oxidizing gas and the material to be oxidized are of course added before the recirculated gas passes through the converter.

A few of the reactions which can be effectively carried out by use of the present invention are the following:

1. Reactions in which an intermediate oxidation product is produced. The oxidation of benzol, toluol, phenol, tar phenols or furfural and other compounds containing the group —$CH_2$—$CH$=$CH$—$CH_2$— to maleic acid and fumaric acid or mesotartaric acid; cresol to salicylaldehyde and salicylic acid; toluol and the various halogen and nitro-substituted toluols to the corresponding aldehydes and acids; xylenes, pseudocumene, mesitylene, paracymene and other derivatives to the corresponding aldehydes and acids; naphthalene to naphthaquinone, phthalic anhydride and maleic acid; phthalic anhydride to maleic acid and fumaric acid; anthracene to anthraquinone; phenanthrene to phenanthraquinone, diphenic acid, phthalic anhydride and maleic acid; acenaphthene to acenaphthylene, acenaphthaquinone, bisacenaphthylidenedione, naphthaldehydic acid, naphthalic anhydride and hemimellitic acid; fluorene to fluorenone; eugenol and isoeugenol to vanillin and vanillic acid; methyl alcohol and methane to formaldehyde; ethyl alcohol to acetic acid; ethylene chlorhydrine to chloracetic acid and the like.

2. Reactions in which an undesired impurity is burned out, such as the purification of crude anthracenes of various degrees of impurity with total combustion of carbazole, dead oils and in some cases phenanthrene; purification of crude naphthalens and crude mononuclear hydrocarbons, such as benzols and the like; purification of ammonia from coal tar with the burning out of the organic impurities such as phenolic bodies present, etc.

3. Oxidation of mixtures of organic compounds to desired intermediate products with removal of impurities such as the oxidation of crude anthracenes, phenanthrenes and the like to intermediate products such as anthraquinone, phenanthraquinone, diphenic acid, phthalic anhydride, and the like with concomitant removal of carbazole and dead oils by total combustion; the oxidation of crude tar acids to maleic and fumaric acids with the combustion of certain impurities, etc.

The invention will be described in greater detail in connection with the following specific examples which are illustrative only and do not limit the scope of the invention.

*Example 1*

250 volumes of 8—12 mesh aluminum granules are coated with 24 parts by weight of ammonium metavanadate which is preferably dissolved in water at 90° C. and sprayed onto the aluminum granules, which are stirred and heated to a temperature at which the water is instantly vaporized. The catalyst thus prepared is calcined in an air stream at 450° C. and then is filled into the tubes of a tubular converter, which are preferably from ½ to ¾" in diameter, the height of the catalyst being from 4 to 8". The tubes are surrounded by bath, which preferably is one which boils at about the desired reaction temperature. Mercury may be used for the bath with or without suitable means for varying the pressure under which it boils, but preferably mercury alloys such as mercury-cadmium or mercury-lead are used.

This contact mass is well suited for the catalytic oxidation of benzol, phenol, tar phenols, furfural, phthalic anhydride, and many hydrocarbons containing the group —$CH$—$CH$=$CH$—$CH$— to maleic acid and mesotartaric acids. The materials are vaporized and a protecting agent such as gasoline, methyl alcohol, gases containing methane or other aliphatic hydrocarbons, carbon monoxide or hydrogen are added. The mixture is passed over the contact mass at 330–400° C., good yields of maleic acid being obtained. The oxidizing gas may be air or an artificial mixture containing the best proportions of oxygen, which will of course depend on the amount of protective agent used. The amount of oxygen in general should be so chosen that there is sufficient oxygen to carry out the main reaction even after oxidizing the protective agent. If desired the gas may be recirculated after removal of the reaction products and adjustment of composition.

A particular mixture which gives good results is one in which 5 parts of benzol or furfural vapors and 5 parts of methyl alcohol are vaporized into 50 parts of air and passed over the contact mass, resulting in the production of maleic acid and formaldehyde. Yields of maleic acid are better than 60% and yields of 80% or better of formaldehyde are likewise obtained. The separation of formaldehyde from maleic acid may be effected by the usual well known means.

If the above process is carried out in a circulatory manner, the reaction product is separated out and the excess gases are vented after washing with water or a hydrosulfite solution.

Instead of using a vanadium pentoxide catalyst as described above, one or more other metal oxides of the fifth or sixth groups of the periodic system may be used. Salts of the metal acids of the fifth or sixth groups of the periodic system, such as those of aluminum, titanium, iron, cobalt, zirconium or copper, are also very effective when used singly or in admixture.

*Example 2*

300 parts of $V_2O_5$ are intimately mixed with 93.186 parts of silver nitrate and melted. The melt is permitted to cool, puffing up with evolution of oxygen, and is broken into pea-size fragments, constituting silver vanadyl vanadate, a non-siliceous base exchange body. Instead of preparing silver vanadyl vanadates, the corresponding vanadyl vanadates of the alkali metals may be prepared, having preferably the following ratios of $V_2O_5$ to base:

$V_2O_5$ to $Na_2O$ as 6:1
$V_2O_5$ to $K_2O$ as 5:1
$V_2O_5$ to $Li_2O$ as 2:1
$V_2O_5$ to $Rb_2O$ as 5:1
$V_2O_5$ to $Cs_2O$ as 5:1

The vanadyl vanadates may also be prepared by wet methods. After preparation the alkali is replaced by base exchange with one or more solutions of aluminum sulfate, copper sulfate, or iron sulfate.

Instead of using the non-siliceous base exchange bodies in their concentrated form, they may be pulverized and coated onto natural or artificial carrier fragments, or if made by wet methods may be diluted during formation. Carrier materials, such as, those rich in silica as quartz fragments, quartz filter stones, diatomaceous stones, pumice fragments; fragments of natural or artificial silicates, base exchanging or non-base exchanging, and especially zeolites diluted with materials rich in silica; non-siliceous base exchange bodies and their derivatives; aluminum granules; metal alloys such as ferrosilicon, ferro-vanadium; and the like, may be used. If desired when the vanadyl vanadate is prepared by wet methods it may be formed on the carrier fragments, producing a very adhesive coating. If cementing agents are required to effect a strong coating, compounds of alkali and alkaline earth metals such as potassium sulfate or potassium nitrate may be used in amounts up to 10% of the material to be coated. These compounds not only act as cementing agents but are also stabilizers and tone the activity of the catalyst. The activity of the contact mass can be still further adjusted by small additions of so-called stabilizer promoters which are compounds which do not have specific catalytic activity for the particular reaction but are catalytically active for other reactions. Examples of these stabilizer promoters are aluminum oxide, titanium oxide, thorium oxide, and the like.

Silver vanadyl vanadate coated on pumice and used in a converter as described in Example 1 is well suited for the catalytic oxidation of toluol to benzoic acid and benzaldehyde in the presence of methanol or gasoline. Yields up to 85-90% of theory are obtained. When methanol is used as the protecting means, more than 80% of the methanol is transformed into formaldehyde. The temperature of the converter bath should be 380° C. 150 liters of air should be passed through each tube per hour carrying 10.2 grams of toluol and 7.1 grams of methanol. The reaction product contains considerable quantities of unchanged toluol which can easily be separated and reused. The yields of benzoic acid are over 90% of theory and about 84% of the methanol is transformed into formaldehyde. Small amounts of benzaldehyde are present in the reaction mixture. If desired the reaction can be carried out in a circulatory process, the same yields being obtained and the unreacted toluol and methanol being directly reused as they remain in the circulating gas stream after the benzoic acid and formaldehyde have been removed.

Instead of using methanol as a protecting agent, gasoline may be used, which is for the most part completely burned though small amounts of aliphatic acid may be sometimes detected in the reaction product.

Instead of oxidizing toluol, other aromatic compounds containing side chains may be oxidized under the same conditions. For example, cresol may be oxidized to salicylaldehyde and salicylic acid; halogen- or nitro- substituted toluols may be oxidized to the corresponding benzaldehydes and benzoic acids; xylene, pseudocumene, mesitylene, paracymene and their derivatives may also be oxidized.

Aromatic compounds which do not contain side chains can also be oxidized under the same conditions, for example naphthalene can be oxidized to alphanaphthaquinone; acenaphthene to naphthalic anhydride; or fluorene to fluorenone. In each case the yields are much better than those obtainable without a protecting agent.

*Example 3*

18.2 parts of $V_2O_5$ are dissolved in 250 parts of a potassium hydroxide solution containing 22.6 parts of KOH. 27 parts of ferric sulfate are dissolved in 300 parts of water at 50-60° C., and the potassium vanadate solution is poured in with vigorous agitation. The yellow precipitate formed is filtered with suction, washed with water until the filtrate is colorless, sludged with 200 parts of water, and 15 parts of potassium sulfate dissolved in 200 parts of water are added to the suspension which is then coated uniformly onto 500 volumes of 8–10 mesh pumice fragments by spraying the suspension onto the stirred and heated carrier material so that the water is instantly vaporized. Potassium sulfate acts as a stabilizer for the contact mass and the amount may be varied within wide limits or, if desired, it may be partly or entirely replaced by other compounds of alkali or alkaline earth metals, such as potassium nitrate and potassium nitrite.

The vanadium in the contact mass may be replaced partly or wholly by corresponding amounts of the other metal acids of the fifth and sixth groups of the periodic system and the iron may be partly or entirely replaced by one or more other salt solutions, such as those of manganese, aluminum or cobalt.

It is frequently advantageous to mix the reaction product obtained above with 5–10% by weight of freshly precipitated metal oxides, such as $Fe_2O_3$, which may be considered as stabilizer promoters. The contact masses described above are filled into a converter such as that described in Example 1 and can be used for the catalytic oxidation of acenaphthene to naphthalic anhydride in the presence of paraffin protecting agents, such as gasoline. Acenaphthene is uniformly vaporized with gasoline and air in the ratio of 1:2:25 and passed over the contact mass at a bath temperature of 380–400° C. Naphthalic anhydride of high purity is obtained with yields from 85–95% by weight.

It is also effective to carry out the above catalytic reactions in a circulatory process using oxidizing gases containing a lower oxygen content than air. In such cases appreciable amounts of naphthaldehydic acid, acenaphthaquinone and acenaphthylene are obtained.

The same reaction conditions and contact mass may be used for the catalytic oxidation of anthracene to anthraquinone, naphthalene to alphanaphthaquinone, etc.

What is claimed as new is:

1. A method of catalytically oxidizing aromatic organic compounds in the vapor phase, which comprises vaporizing the compounds, admixing the vapors with an oxidizing gas and with an aliphatic compound which is more readily oxidized than the organic compound, and passing a mixture of the vapors over a heated oxidation contact mass.

2. A method of catalytically oxidizing aromatic organic compounds in the vapor phase, which comprises vaporizing the compounds, admixing the vapors with an oxidizing gas and with methyl alcohol, and passing a mixture of the vapors over a heated oxidation contact mass.

3. A method of catalytically oxidizing a benzene compound having a single methyl group attached to the benzene nucleus in the vapor phase, which comprises vaporizing the compound, admixing the vapors with an oxidizing gas and with a protective agent which is more readily oxidized than the organic compound and passing a mixture of the vapors over a heated oxidation contact mass.

4. A method of catalytically oxidizing a benzene compound having a single methyl group attached to the benzene nucleus in the vapor phase, which comprises vaporizing the compound, admixing the vapors with an oxidizing gas and with methyl alcohol, and passing a mixture of the vapors over a heated oxidation contact mass.

5. A method of catalytically oxidizing unsaturated cyclic organic compounds in the vapor phase, which comprises vaporizing the compounds, admixing the vapors with an oxidizing gas and with a protective agent which is more readily oxidized than the organic compound, and passing a mixture of the vapors over a heated oxidation contact mass which contains a vanadium oxygen compound and at least one compound of a metal falling within the group consisting of alkali metals and alkaline earth metals.

Signed at Pittsburgh, Pennsylvania this 5th day of February, 1929.

ALPHONS O. JAEGER.